United States Patent [19]

Pithouse et al.

[11] Patent Number: 4,624,720
[45] Date of Patent: Nov. 25, 1986

[54] DIMENSIONALLY HEAT-RECOVERABLE ARTICLE

[75] Inventors: Kenneth B. Pithouse, Lesulis, France; Thomas A. Kridl, Union City; James T. Triplett, Livermore, both of Calif.

[73] Assignee: Raychem Ltd, London, England

[21] Appl. No.: 567,121

[22] Filed: Dec. 30, 1983

[30] Foreign Application Priority Data

Jan. 6, 1983 [GB] United Kingdom ................ 8300219
Aug. 16, 1983 [GB] United Kingdom ................ 8322004

[51] Int. Cl.$^4$ ............................................. B29C 27/00
[52] U.S. Cl. ...................................... 156/86; 138/155; 174/DIG. 8; 428/36; 428/229; 428/257; 428/258; 428/259; 428/343; 428/349; 428/260; 428/224; 428/290; 264/342 R
[58] Field of Search ................... 156/86; 428/36, 229, 428/257, 258, 259, 343, 349, 260, 290, 224; 174/DIG. 8; 138/155

[56] References Cited

U.S. PATENT DOCUMENTS

| | | | |
|---|---|---|---|
| 3,473,576 | 10/1969 | Ammeus | 139/420 |
| 3,669,157 | 6/1972 | Woodall et al. | 139/387 |
| 3,945,493 | 3/1976 | Cardinal | 206/386 |
| 4,148,957 | 4/1979 | Berger et al. | 428/36 |
| 4,576,666 | 3/1986 | Harris et al. | 428/102 |

FOREIGN PATENT DOCUMENTS 0046346 2/1986 European Pat. Off. .
1005951 9/1965 United Kingdom .
2022010 12/1979 United Kingdom .

*Primary Examiner*—James J. Bell
*Attorney, Agent, or Firm*—T. Gene Dillahunty

[57] ABSTRACT

A recoverable article comprising a recoverable fabric having a recovery of at least 40% may be used for providing environmental protection.

29 Claims, No Drawings

DIMENSIONALLY HEAT-RECOVERABLE ARTICLE

This invention relates to heat-recoverable articles.

A heat-recoverable article is an article the dimensional configuration of which may be made substantially to change when subjected to heat treatment. Usually these articles recover, on heating, towards an original shape from which they have previously been deformed, but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In the production of heat recoverable articles, the polymeric material may be cross-linked at any stage in the production of the article that will enhance the desired dimensional recoverability. One method of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape. A further method comprises deforming a substantially non-crosslinked polymeric material at a temperature below the crystalline melting point or softening point of the material, fusing together parts of the material or a part or parts of the material and at least one other polymeric component to produce the configuration of at least one hollow heat-recoverable article and subsequently cross-linking the substantially non-cross-linked material.

In other articles, an elastomeric member is held in a stretched state by a second member, which, upon heating weakens and thus allows the elastomeric member to recover. Heat-recoverable articles of this type are described, for example, in British Pat. No. 1,440,524 in which an outer tubular elastomeric member is held in a stretched state by an inner tubular member.

Heat-recoverable articles have found particular use in the environmental protection of elongate substrates such as for example splices in telecommunication cables.

It has been proposed, in U.S. Pat. Specification No. 3,669,157 to Carolina Narrow Fabric Co. and in Japanese Pat. No. 52-25290 to Sumitomo Electric Industries, to form heat-shrinkable tubular fabric articles. However none of the fabrics disclosed therein are intended for, nor are they suitable for forming articles which may be used in applications such as telecommunication splice cases or the like where the substrate to be covered has widely varying dimensions, nor is there any suggestion that a prior art article could be supplied for use over any one of a wide range of differently sized substrates.

The present invention provides a dimensionally heat-recoverable fabric which comprises fibres that will recover when heated to a recovery temperature thereof, wherein the recoverable fibres have a tensile strength of at least 0.1 MPa at their recovery temperature and have been stretched to an extent that will cause the fabric to recover by at least 40% when heated to the recovery temperature of the recoverable fibres.

By "the recovery temperature" of polymeric heat-recoverable materials is meant that temperature at which the recovery of the polymeric material will go substantially to completion. In general, the recovery temperature will be the crystalline melting temperature if the polymer is crystalline or the glass transition temperature if the polymer is amorphous. The recovery percentage is the change in a dimension expressed as a percentage of the original dimension. The extent of recovery may also be expressed as a ratio, in which case we refer to the original dimension based on the new dimension. Thus, 40% corresponds to a ratio of 1.67:1.

Preferably the fibres have a recovery temperature of at least 60° C., more preferably from 80° to 250° C. and especially from 120° to 150° C.

The heat-recoverable fibres are preferably formed from a polymeric material that imparts good physical properties and, in particular, good creep resistance to the fibres. Olefin polymers such as polyethylene and ethylene copolymers, polyamides, polyesters, acrylic polymers and other polymers capable of being cross-linked may be employed. A particularly preferred polymeric material for the fibres is based on polyethylene having a density of from 0.94 to 0.97/gms/cc, an Mw of from $80 \times 10^3$ to $200 \times 10^3$ and an Mn of from $15 \times 10^3$ to $30 \times 10^3$.

The fibres preferably have a minimum recovery stress of $10^{-1}$ MPa, more preferably $5 \times 10^{-1}$ and usually at least 1 MPa at a temperature above the transition temperature of the fibres. There is in theory no upper limit of recovery stress, but in practice 200 MPa and more usually 100 MPa is the highest figure normally achievable with polymeric fibres. The tensile strength of the fibres at their recovery temperature is preferably increased to 0.1 MPa or higher by cross-linking the polymeric material from which they are formed, either by chemical means or by irradiation e.g. high energy electron irradiation, gamma radiation or by ultra violet radiation.

When the fibre is cross-linked by irradiation it is convenient to incorporate the cross-linking step into manufacture of the fibre. The fibre can be extruded, stretched at a temperature below its melting temperature, preferably by an amount of from 800 to 2000%, then subjected to irradiation to effect cross-linking. A less preferred way of making the fibre is to extrude the fibre, irradiate to cross-link, then heat the fibre, preferably to above its melting temperature, stretching the fibre, and then cooling the stretched fibre. High density polyethylene fibres are preferably irradiated with a dose of from about 5 to about 35 megarads, preferably from about 5 to about 25 megarads, and in particular from about 7 to about 18 megarads especially from 10 to about 18 megarads. Usually the gel content of the cross-linked fibre is greater than 20%, preferably greater than 30%, most preferably greater than 40%. In practice, gel contents greater than 90% are not easily achievable.

The heat-recoverable fabric can, in the broadest aspect of the invention, be made solely of heat-recoverable fibres as described above or can contain other fibres in addition to the heat-recoverable fibres. The fabric can be knitted, woven, non-woven, braided, or the like. In a preferred embodiment the fabric is a woven fabric. The woven fabric can contain only heat-recoverable fibres or it can contain heat-recoverable fibres together with non-heat-recoverable fibres or filaments. For example, the fabric can contain heat-recoverable fibres in one direction and non-heat-recoverable fibers in the other. This produces a heat-recoverable fabric which is recoverable in only one direction. Particularly preferred fabrics having differential properties are described in UK patent application No. 8300222. The fabric can be woven in a pattern, for example, twill, broken twill, satin, sateen, Leno, plain, hop sack, sack, matt and various weave combinations in single or multiple ply weaves e.g. 2- or 3-ply weaves. Preferably the fabric is a woven fabric that has heat-recoverable fibres in one direction and dimensionally heat-stable fibres in the other direction so that the fabric as a whole is recoverable in a single direction only, and the fabrics described below will, in general, be recoverable only in one direction.

The fabric may alternatively be knitted if desired, either warp knitted or weft knitted. If the fabric is solely from heat-recoverable fibres it will be recoverable in two dimensions, but if, as is preferred for the knitted fabrics, it is knitted from a heat stable fibre and a heat-recoverable fibre is either warp or weft inserted, it will be recoverable in only one direction.

The fabric according to the invention has the advantage that it may be recovered over a number of substrates such as cable splices and other substrates that contain transitions, that is, in which the substrate dimensions vary from one point to another, which have not been able to be enclosed by the previously proposed fabrics.

As stated above, the fabric recovers on heating by at least 40%, that is to say by at least 40% of its original dimension in the direction of recovery i.e. a recovery ratio of at least 1.67:1. In order to achieve any particular fabric recovery ratio the recovery ratio of the fibres will need to be somewhat higher although the exact degree of recovery of the fibres will depend also on the weave design as discussed below. Preferably the fabric recovers by at least 50%, especially at least 60% and most especially at least 70% of its original dimensions. The recovery ratio of the fibres is preferably at least 2:1, more preferably at least 3:1 e.g. at least 5:1 and especially at least 8:1 although there is usually no advantage in having a recovery ratio of greater than 20.1, and often no advantage over 15.1.

In order to maximise the recovery of the fabric for any given recovery of the fibre, the fabric preferably has a high float in the heat-recoverable fibre direction e.g. a float of at least 4 and especially from 6 to 15, in which case twill (including broken twill), satin, sateen and sack or plain weaves are preferred and especially satin. In addition or alternatively the heat-shrinkable fibres preferably have a low degree of crimp, the degree of crimp being the additional length of an individual fibre to form a given length of the fabric expressed as a percentage of the length of the fabric, the additional length of fibre being due to the serpentine path the fibre follows in the weave. Thus a fibre which is completely straight has a crimp of 0%. Preferably the crimp of the recoverable fibres is less than 50%, more preferably less than 30%, and especially less than 20%. As will be appreciated, the crimp of the recoverable fibres will be decreased by inter alia by increasing their float.

Another important feature is the nature of the heat stable fibres. Preferably they have a stiffness at ambient temperatures that is less than the stiffness of the recoverable fibres since this disparity of stiffness will decrease the crimp of the recoverable fibres. Thus heat-stable multifilament yarns are preferred to monofilaments in view of their reduced stiffness, and smaller fibres are also preferred, the heat-stable fibres or yarns preferably having a titre of less than 3000 dtex, and especially less than 1500 dtex although they will usually have a titre of at least 1000 dtex.

The fabric is advantageously constructed so as to reduce the lateral movement of the recoverable fibres at least at the recovery temperature of the fibres. Thus, preferably the fabric is constructed so that the heat-recoverable fibres will not move laterally by more than 10 times, especially not more than 5 times the heat-recoverable fibre diameter at the recovery temperature of the fibres when subjected to a lateral force per fibre equal to the recovery force of an individual fibre. For fibres of the type used in the Examples herein, this corresponds to distances of not more than 2 mm, especially not more than 1 mm. This contruction has the further advantage that the fabric may be recovered over substrates containing transitions in which the dimensions of the substrate vary discontinuously. An example of such a substrate is a cable splice liner having a central cylindrical portion of relatively large diameter and tapering end portions of generally frusto-conical shape which may form a ridge where they join the central portion although a gentle or smooth transition is preferred. In this case the change in dimensions of the substrate is accommodated by the relatively high recovery ratio of the recoverable fibres, which extend circumferentially around the substrate, and which are prevented from shifting axially along the frusto conical end portions towards those regions of smaller diameter (which tendency is caused by the unresolved recovery forces of the fibres).

The fabric may be designed in a number of ways to resist lateral movement of the recoverable fibres. For example the fabric preferably has a high weave density of heat-recoverable fibres e.g. at least 20, more preferably at least 35 and most preferably at least 30 fibres per c.m. in which case a relatively low weave density, e.g. less than 10 and preferably less than 5 fibres per c.m. for the heat stable fibres is preferred. In any case, a higher weave density for the heat-recoverable fibres than for the heat-stable fibres is preferred. In order to achieve high weave densities for the heat recoverable fibres it is preferred that they be distortable, that is to say that, at least at the recovery temperature of the fibres, they are capable of being flattened slightly, e.g. by at least 20% under the same force as their recovery force. This property is desirable since the radial dimension of a recoverable fibre will increase by the same amount as its longitudinal contraction so that, for high weave densities, adjacent recoverable fibres will touch each other as they recover and should therefore be able to increase in thickness in a direction normal to the plane of the fabric as they are "squashed" by each other. Examples of material from which such fibres may conventionally be formed are medium density and high density polyethylene. In addition, by employing a weave design in which the float of the recoverable fibres is high, as described above, the weave density of the recoverable fibres may be increased.

Another way in which the tendency of the recoverable fibres to shift laterally may be reduced is by employing a weave design having a high degree of crimp of the heat-stable fibres for example a crimp of at least 20%, preferably at least 30% and especially at least 40%. This may be achieved by using a weave design in which the heat-stable fibres have a low float, e.g. a float of 2 or 1. A high degree of crimp for the heat-stable fibres reduces the tendency of the recoverable fibres to shift laterally because the heat-stable fibres have a more serpentine configuration which will need to be disturbed in order for the recoverable fibres to shift. However, this very feature can reduce the lateral stability of the recoverable fibres if any stresses are present (such as air pressure within a sleeve of the fabric) which tend to expand the fbric. Such an expansion would straighten the crimped fibre by reducing the crimp, thus allowing the recoverable fibres too move apart. Clearly this can happen to a lesser extent where the crimp in small. Also, the higher the weave density of heat-stable fibres, measured in fibres per unit length, the smaller the tendency is for the recoverable fibres to shift laterally. Therefore, if pressure retention within a splice is of primary consideration it may be beneficial to reduce the crimp of the heat stable fibres in order to minimise the axial extensibility of the fabric when used in a splice case, in which case a heat stable fibre crimp of not more than 50%, especially not more than 30% and most especially not more than 18% would be preferred. However, as stated above, it is desirable not to have too high a weave density of heat-stable fibres since this will reduce the possible weave density of the recoverable fibres. It has been found that a good compromise is achieved if the product of the heat-recoverable fibre diameter and the weave density of the heat recoverable fibres is in the range of from 0.4 to 1.3 especially from 0.5 to 1.1.

The heat-recoverable fabric according to the invention has a wide variety of uses. For example it may be recovered over substrates, especially substrates having varying or discontinuous contours, to provide mechanical protection or protection from the environment. Whilst the fabric may be used alone, it is often advantageous for it to be employed in conjunction with an adhesive or sealant or other polymeric material that renders it substantially impervious to fluids, the adhesive, sealant or other material either being applied in situ when the fabric is installed or applied before sale of the fabric. Thus, for example, the fabric may be impregnated with a curable adhesive composition, e.g. a curable expoxy composition and especially an optionally b-staged epoxy resin that is cured by means of a polyamide, an anhydride or an isocyanate although other materials may be used such as phenolic resins or isocyanate/-phenolic resin. The resin may alternatively be laminated on to the fabric or it may be employed in particulate form as described in U.K. patent publication No. 2104800. Alternatively an adhesive such as a hot-melt adhesive and especially an adhesive based on a polyamide or an ethylene-vinyl acetate copolymer may be applied either to the fabric or to the substrate during installation.

Most preferably, however, the fabric according to the invention is used in combination with a matrix polymer layer which softens when heated to accommodate recovery of the fabric, to form a single composite structure.

The heat-recoverable fabric is preferably bonded to, and preferably embedded in, the polymer matrix material to form a true composite structure. At or above the recovery temperature of the fibres the polymer matrix material should be capable of limited flow under pressure so that it retains the integrity of the composite structure without substantially impeding recovery of the fibres. It preferably has, at the aforesaid temperature, an elongation to break of greater than 50%, most preferably greater than 100% especially from 400–700%, and a 20% secant modulus of preferably at least $5 \times 10^{-2}$ MPa, most preferably at least $10^{-1}$ MPa, measured at a strain rate of 300% per minute.

The ability of the matrix material to flow when heated need not necessarily apply after recovery, although it may be desirable that the product be flexible at room temperature. Thus, for example, the polymer matrix material may eventually cure to a thermoset on heating, although it is preferred that the cure rate is sufficiently slow under the recovery conditions not to cause the material to drip off the fabric during the recovery of the fibres. Thus, for example, the polymer forming the matrix material may contain grafted hydrolysable silane groups which are capable of crosslinking the material subsequently in the presence of moisture. Examples of such materials are given in U.S. Pat. No. 1,286,460 to Dow Corning Ltd. Alternatively the matrix material may include a polymer, preferably a rubber and especially an acrylic rubber, which contains epoxy groups and a room temperature insoluble curing agent e.g. dicyandiamide.

The polymer matrix material can be either a thermoplastic or an elastomer. In general, we prefer that the polymer matrix material and the material of the recoverable fibres be chemically and/or physically compatible. By this we means that they be of similar or identical chemical types and/or that their relevant physical properties during lamination, installation and use be similar or identical. In particular, we prefer that the matrix and the fibres be of low density and high density polyethylene respectively. The skilled man will be able to choose other pairs of compatible polymers. Examples of thermoplastic materials suitable as the matrix material include ethylene/vinyl acetate copolymers, ethylene/ethyl acrylate copolymers, polyethylenes including the linear low, low density and high density grades, polypropylene, polybutylene, polyesters, polyamides, polyetheramides, fluoropolymers e.g. perfluoro-ethylene/ethylene copolymer and polyvinylidene fluoride. Considering the second class of materials this can include acrylonitrile butadiene styrene block copolymer, acrylic elastomers including the acrylates and methacrylates and their copolymers, e.g. polybutyl acrylate, and poly 2-ethylhexyl acrylate, the high vinyl acetate copolymers with ethylene (VAE's), polynorbornene, polyurethanes and silicone elastomers and the like. The matrix material can be cross-linked, for example, a cross-linked ethylene/ vinyl acetate copolymer, a linear low density or high density grade polyethylene or an acrylic elastomer. The material can be cross-linked by irradiation or by other means such as chemical cross-linking using, for example, a peroxide cross-linking agent, provided that the physical properties of the matrix at the recovery temperature are as specified after the cross-linking step. Where irradiation is used a dose of 10 megarads or less, in particular from 3–7 megarads, is preferred. The resulting extent of cross-linking allows the matrix to recover with the fabric and also to prevent the matrix running or dripping during heat recovery, especially by means of a torch. The recovery ratio of the composite after irradiation is preferably at least 50% especially at least 70% of that before irradiation. The dose values given may be regarded as typical for olefinic polymers such as polyethylene of low orientation, and the skilled man will be able to choose suitable dose values depending on the presence of various concentrations of prorads or antirads, if any. We have found that excellent physical properties of the composite structure (particularly as regards integrity during heat recovery) can be achieved with retention of high recovery ratios, if suitable materials and suitable cross-linking treatment are chosen, as explained herein. We prefer that the recovery ratio of the composite structure is at least 40% more preferably at least 65%, especially at least 70% of that of the free fabric. The recovery of the composite structure is preferably at least 45% (i.e. a ratio of 1.67:1), more preferably at least 50%, especially at least 60%.

The heat-recoverable fabric is preferably bonded to the polymer matrix material, and this bonding may be adhesive, that is to say by chemical or physical surface interaction, or mechanical interlocking.

Most preferably, the heat-recoverable fabric is embedded in the polymer matrix material thereby forming a composite structure. By "embedded" is meant that the polymer matrix material surrounds at least a major portion of the fibre surface area of the fibres making up the fabric.

The fibres are preferably totally surrounded by polymer matrix material, however it is possible and at times desirable, that substantially less than the total fibre surface area be surrounded by polymer matrix material. Sufficient fibre area should be bonded to the polymer matrix material to result in a composite structure which retains its integral nature during recovery of the article.

Preferably the polymer matrix material at least on the surface of the composite structure facing the source of heat is substantially unstressed and has a thickness above the fabric of at least 0.03, more preferably at least 0.07 and especially from 0.2–2 mm, or more as described in UK patent application No. 8300217, as this improves the ability of the composite structure to be heat recovered using a conventional propane torch.

In the composite structure, the ratio of the volume occupied by the heat-recoverable fibres of the fabric to the total volume of the composite is usually at least about 0.01:1, preferably from about 0.1:1 to about 0.8:1 and most preferably from about 0.2:1 to about 0.4:1.

In the composite structure the heat-recoverable fibre volume in any given unit volume of composite may dependent on the fibre strength, polymer matrix strength and the integrity of the fibre/polymer matrix structure under recovery conditions. We have found that an acceptable recoverable composite product may be obtained if the inequality (1) is be satisfied:

$$\frac{X}{Y} \frac{(1-R)}{R} < 1 \quad (1)$$

wherein X is the 20% secant modulus of the polymer matrix material and Y is the recovery stress of the fibres, both at or above the recovery temperature of the fibres, and R is the mean effective volume fraction of heat-recoverable fibres in the composite structure along a given direction based on the total volume of the composite structure, or relevant portion thereof. Preferably $$\frac{X}{Y} \frac{(1-R)}{R} < 0.5$$

most preferably <0.05.

The composite structure can be formed for example by laminating one or more layers of polymer matrix material to the heat-recoverable fabric. Sufficient heat and pressure is preferably applied so that at least a major part of the fabric is bonded to the polymer matrix material. The result is a composite structure which on application of heat recovers as a unit.

Other methods of bonding the fabric to the matrix can be used, for example, impregnation, solution coating, slurry coating, powder coating, reactive prepolymers, e.g. acrylic prepolymers activated by UV or peroxide, and the like. In any bonding method employed sufficient heat to cause the fabric to recover to any significant extent should be avoided, unless the fabric is suitably restrained from recovery.

In one embodiment the fabric of the invention provides the recoverable fibres of a recoverable composite structure comprising a cross-linked polymeric material and cross-linked recoverable fibres by virtue of which the composite structure is recoverable.

Such a recoverable composite structure can be made by applying to the cross-linked recoverable fibres the polymeric material, and then cross-linking the polymeric material.

The fibres may be cross-linked to increase their post-recovery strength, and a recovery stress of at least 1 MPa, preferably 1.5 to 5 MPa will be suitable. The polymeric material is desirably cross-linked to prevent it dripping or running during heat recovery, particularly by means of a torch. Too much cross-linking of the polymeric material will, however, reduce the recovery ratio of the composite. This may be a problem since a different cross-linking treatment may be required in the fibres and the polymeric material. This is a reason for the two cross-linking steps being carried out separately above. The problem may arise due to different cross-linking responses (beam response in the case of irradiation cross-linking) of the materials used for the fibres and the polymeric material, or due to the treatment undergone by the fibres and polymeric material. This second effect includes the reduced beam response of the fibres that results from their orientation produced by drawing to make them recoverable.

The composite structure may, nonetheless, be produced using a single cross-linking step if the beam response of the recoverable fibres relative to that of the polymeric material is such that a post-irradiation recovery stress of the fibres, per se, of at least 1 MPa can be reached before the recovery ratio of the composite structure is reduced to a value of 70% of that of the unirradiated composite structure.

The relative beam response may be produced by the presence of prorads in the recoverable fibres and/or antirads in the polymeric material.

In a preferred embodiment of the invention the fabric is incorporated into a flexible recoverable composite structure comprising the recoverable fabric and a polymeric matrix material laminated thereto, in Which:

(a) the recoverable fabric comprises a cross-linked recoverable polyolefin having a recovery stress of 1.5 to 5 MPa; and (b) the matrix is cross-linked such that the recovery ratio available in the composite is at least 65% of that available in the free fabric, and the polymeric matrix material, per se, after irradiation has a room temperature elongation of 400–700% measured at a strain rate of 300%/minute.

Irradiation, in addition to providing one means of cross-linking, can provide other features in the composite structure. If the fibres are irradiated particularly in the presence of oxygen, before application of the polymeric material then a change in the surface properties of the fibres may occur (such as oxidation) which improves adhesion between the fibres and the polymeric material. An irradiation step after application of the polymeric material may also aid such bonding by forming a cross-linked bond between the two components of the composite structure.

Also, or instead depending on the conditions under which the polymeric material is applied, some mechanical interlocking between the fibres and the polymeric material may be provided.

The heat-recoverable article can be used in numerous applications. It is particularly suitable for enclosing elongate substrates such as pipes, conduits, cables and the like. The heat-recoverable article can be coated on a surface thereof with a layer of a sealant or adhesive composition. The sealant can be a mastic and the adhesive can be a hot-melt adhesive. Hot-melt adhesives which can be used include polyamide and ethylene vinyl acetate copolymer based adhesives. Such adhesives are well known, for example see U.S. Pat. Nos. 4,018,733, and 4,181,775, the disclosures of which are incorporated herein by reference. If desired a heat-curable adhesive may be used, for example as described in U.K. patent Application No. 82,24379.

By appropriate selection of the polymer matrix material, the polymer matrix material can function as an adhesive to secure and seal the recovered composite structure to the substrate. The fabric can be embedded in more than one polymer matrix material to provide desired properties. For use in enclosing elongate substrates, the fabric can be laminated with a layer of matrix material on each surface of the fabric, the surface which will be the inner surface when in use can be laminated to a polymer matrix material which has adhesive properties while the outer surface is laminated to a material which does not. As will be readily apparent the matrix material can be selected for various other desirable properties inherent in the polymer material itself or provided with various additives such as antioxidants, ultra violet stabilizers, pigments, anti-tracking agents and the like.

The heat-recoverable article of this invention is typically a sheet but can be of any configuration such as tubular, including multiple tubular portions interconnected, for example, a break-out structure for cable splices where one cable is spliced to two or more other cables.

A heat-recoverable sheet in accordance with this invention can be used as a wraparound enclosure as described in UK patent application No. 8300223. In general, the ability of a fabric or fabric composite to be penetrated without splitting, allows portions to be joined together (for example to form a wraparound) by a mechanical joining arrangement that penetrates the fabric preferred arrangements are stitches or staples. Heat recoverable articles according to the invention have been found to be particularly suitable for use in enclosing a splice between pressurized telecommunication cables. The recovered article is exceptionally resistant to the effects of pressure and preferred embodiments have sufficient hoop strength to resist rupturing under about 70 KPa pressure (the pressure typically used in pressurized telecommunication systems) at ambient temperatures of such systems.

Usually, it will be desirable for the composite structure to contain a single fabric embedded in or bonded to the matrix polymer. However it is quite possible, and in some instances it may be preferable for the composite structure to comprise a plurality of fabrics, e.g. two fabrics having a layer of the matrix polymer therebetween. Articles that employ more than one fabric are especially useful for enclosing substrates that have high internal pressures or for use in cases in which the article may be subject to particularly severe mechanical abuse.

The following Examples illustrate the invention:

Heat-recoverable fabrics were prepared by weaving high density polyethylene monofilaments into fabrics of various weave patterns and subjecting the fabric to irradiation. The fabrics were irradiated using 6 MeV electrons in air at a dose rate of 0.24 Mrads/minute. Properties of the fibres and fabrics are listed in Tables I and II respectively.

TABLE I

Fiber Properties

| Fibre | Property | Radiation Dosage (Mrads) | | |
|---|---|---|---|---|
| | | 8 | 16 | 32 |
| 1 | 100% Modulus (MPa) at 150° C. | 0.13 | 0.3 | 0.42 |
| | Tensile Strength (MPa) at 150° C. | 0.93 | 1.4 | 1.46 |
| | Elongation to Break (%) at 150 ° C. | 1480 | 924 | 754 |
| | Gel Content (%)* | 27.0 | 58.0 | 67.0 |
| | Recovery Force (MPa) (peak value) | 1.17 | 1.2 | 1.3 |
| | Recovery (%) | 89 | 88.5 | 88.5 |
| | Diameter = 0.35 mm | | | |
| 2 | Modulus (MPa) at 150° C. | 0.27 | 0.21 | 0.34 |
| | Tensile Strength (MPa) at 150° C. | 1.36 | 1.93 | 2.98 |
| | Elongation to Break (%) at 150 ° C. | 752 | 487 | 777 |
| | Gel Content (%)* | 10.0 | 40.0 | 61.0 |
| | Recovery Force (MPa) (Peak Value) | 0.57 | 0.6 | 0.65 |
| | Recovery (%) | 89 | 87 | 85 |
| | Diameter = 0.29 mm | | | |

*Obtained by refluxing in xylene

TABLE II

Fabric Properties

| Example | Fibre | Weave Type | Recoverable fiber float | Weave Density | Weft Fibre | % Recovery Radiation Dosage (Mrads) | | | |
|---|---|---|---|---|---|---|---|---|---|
| | | | | | | 4 | 8 | 16 | 32 |
| 1 | 1 | Twill 2 × 2 | | 40/7 | Glass | 85 | 86 | 85 | 83 |
| 2 | 1 | Twill 2 × 2 | | 40/11 | Glass | 78 | 80 | 86 | 80 |
| 3 | 1 | Twill 2 × 2 | | 40/20 | Glass | 60 | 70 | 77 | 80 |
| 4 | 1 | Twill 2 × 2 | | 80/13 | Glass | 66 | 75 | 74 | 74 |
| 5 | 1 | Twill 2 × 2 | | 60/10 | Glass | 75 | 76 | 78 | 78 |

TABLE II-continued

| | | | Fabric Properties | | | | | | |
|---|---|---|---|---|---|---|---|---|---|
| | | | Recoverable fiber float | | | % Recovery Radiation Dosage (Mrads) | | | |
| Example | Fibre | Weave Type | | Weave Density | Weft Fibre | 4 | 8 | 16 | 32 |
| 6 | 1 | Twill 4 × 4 | | 80/26 | Glass | — | 55 | 56 | 59 |
| 7 | 1 | Plain (double pick-weft | | 80/7 | Glass | — | 60 | 62 | 60 |
| 8 | 1 | Twill 2 × 2 | | 42/20 | Glass | | | | |
| 9 | 1 | Hopsack | | 40/14 | Glass | — | 60 | 55 | — |
| 10 | 1 | Twill 2 × 2 | | 42/26 | Cotton | | | | |
| 11 | 2 | Twill 2 × 2 | | 90/12 | Glass | 76 | 76 | 76.8 | 76.8 |
| 12 | 2 | Twill 2 × 2 | | 80/12 | Glass | 77 | 77 | 77.5 | 77 |
| 13 | 2 | Twill 2 × 2 | | 60/12 | Glass | 80.5 | 80 | 79.8 | 79.8 |
| 14 | 2 | Sateen | | 70/26 | Glass | 76 | 77.5 | 77.8 | 77.2 |
| 15 | 2 | Plain (double pick-weft) | | 90/6 | Polyester A | | 75** | | |
| 16 | 2 | Twill 2 × 2 | | 90/12 | Polyester A | | 72.5** | | |
| 17 | 2 | Plain | | 90/6 | Polyester B | | 75** | | |
| 18 | 2 | Twill 2 × 2 | | 90/12 | Polyester B | | 72** | | |

*Shown as warp density fibers per inch/weft density fibers per inch
**Values recorded at 10 Mrads
Polyester A = 1000 denier polyester, m. pt. 220° C.
Polyester B = 840 denier polyester, m. pt. 220° C.

We claim:

1. A dimensionally heat-recoverable fabric which comprises fibres that will recover when heated to a recovery temperature thereof, wherein the recoverable fibres have a tensile strength of at least 0.1 MPa at their recovery temperature and have been stretched to an extent that will cause the fabric to recover by at least 40% when heated to the recovery temperature of the recoverable fibres.

2. A fabric as claimed in claim 1, which recovers by at least 50% when heated.

3. A fabric as claimed in claim 1, which recovers by at least 60% when heated.

4. A fabric as claimed in claim 1, wherein the recoverable fibres have a recovery ratio of at least 2:1.

5. A fabric as claimed in claim 1, wherein the recoverable fibres have a recovery ratio of at least 3:1.

6. A fabric as claimed in claim 1, which is a woven fabric.

7. A fabric as claimed in claim 1, which includes dimensionally heat-stable fibres.

8. A fabric as claimed in claim 7, wherein the heat-stable fibres lie substantially perpendicularly to the heat-recoverable fibres.

9. A fabric as claimed in claim 7, which is woven so that the heat-recoverable fibres have a float of at least 4.

10. A fabric as claimed in claim 7 which is constructed so that the heat-recoverable fibres will not move laterally by more than 10 times the heat-recoverable fibre diameter when subjected to a lateral force per fibre equal to the recovery force of an individual recoverable fibre.

11. A fabric as claimed in claim 7, which is woven so that the heat-recoverable fibres have a weave density of at least 20 fibres per centimetre.

12. A fabric as claimed in claim 11, wherein the heat recoverable fibres have a weave density of at least 30 fibres per centimetre.

13. A fabric as claimed in claim 7 which is woven so that the weave density of recoverable fibres is greater than the weave density of heat-stable fibres.

14. A fabric as claimed in claim 7 wherein the heat recoverable fibres are laterally distortable under their own recovery force.

15. A fabric as claimed in claim 7 which is woven so that the heat-recoverable fibres have a crimp of not more than 50%.

16. A fabric as claimed in claim 15, wherein the heat-recoverable fibres have a crimp of not more than 20%.

17. A fabric as claimed in claim 7 which is woven so that the heat-stable fibres have a crimp of at least 20%.

18. A fabric as claimed in claim 17, which is woven so that the heat-stable fibres have a crimp of at least 30%.

19. A fabric as claimed in claim 7, which is woven so that the heat-stable fibres have a float of 1 or 2.

20. A fabric as claimed in claim 7 which is woven so that the product of the weave density of the heat-recoverable fibres and their diameter is in the range of from 0.4 to 1.3 mm.

21. A fabric as claimed in claim 1, which is provided with a sealant or adhesive.

22. A fabric as claimed in claim 20, which is provided with a heat curable adhesive.

23. A composite structure which comprises fabric as claimed in claim 1, and a heat softenable polymeric matrix material.

24. A composite structure as claimed in claim 23, wherein the matrix material is cross-linked.

25. A composite structure as claimed in claim 24, wherein the matrix has been subjected to an irradiation dose of 10 megarads or less to cause the cross-linking.

26. A composite structure as claimed in claim 23, having a recovery ratio at least 65% of that of the free fabric.

27. A composite structure according to claims 23, having a recovery of at least 50%.

28. A method of environmentally protecting a substrate of non-uniform cross-sectional size which comprises positioning around the substrate a structure according to claim 23, and causing recovery of the fabric.

29. A method according to claim 28, wherein the substrate is a cable splice or pipe joint.

* * * * *